(12) United States Patent
Haase

(10) Patent No.: US 10,401,819 B2
(45) Date of Patent: Sep. 3, 2019

(54) METHOD FOR OPERATING A SPECIFIC FIELD DEVICE VIA A MOBILE OPERATOR DEVICE

(71) Applicant: Endress+Hauser Conducta GmbH+Co. KG, Gerlingen (DE)

(72) Inventor: Björn Haase, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 122 days.

(21) Appl. No.: 15/838,806

(22) Filed: Dec. 12, 2017

(65) Prior Publication Data

US 2018/0164767 A1 Jun. 14, 2018

(30) Foreign Application Priority Data

Dec. 13, 2016 (DE) .......................... 10 2016 124 168

(51) Int. Cl.
*G06F 15/177* (2006.01)
*G05B 19/05* (2006.01)
(Continued)

(52) U.S. Cl.
CPC ........... *G05B 19/05* (2013.01); *G05B 19/054* (2013.01); *G06K 7/10297* (2013.01);
(Continued)

(58) Field of Classification Search
CPC .................. G05B 19/05; G05B 19/054; G05B 2219/36159; G05B 2219/31251;
(Continued)

(56) References Cited

U.S. PATENT DOCUMENTS 9,489,506 B2 * 11/2016 Tyson ................... H04L 43/065
9,692,538 B2 * 6/2017 Tyson ................... H04W 56/00
(Continued)

FOREIGN PATENT DOCUMENTS

DE 102010063437 A1 6/2012
DE 102014117894 A1 9/2016

OTHER PUBLICATIONS

Search Report for German Patent Application No. 10 2016 124 168.7, German Patent Office, dated Sep. 13, 2017, 10 pp.

*Primary Examiner* — Krisna Lim
(74) *Attorney, Agent, or Firm* — Mark A. Logan; PatServe

(57) ABSTRACT

A method for operating a specific field device from a first group and a second group of field devices, wherein the first group exchanges data in an IP-based network, and the second group communicates at least via a non-IP-based connection, the method includes the following: transmitting multicast messages having an item of connection information via at least one portion of the field devices of the first group; integrating the operator device into the IP-based network; initiating a connection establishment with a field device of the second group; receiving the transmitted multicast messages by the operator unit so that the connection information is made available to the operator unit; generating a list of all field devices of the first group and the second group; selecting the specific field device using generated list; initiating a specific connection establishment with the specific selected field device; and operating of the specific selected field device with the mobile operator unit.

19 Claims, 1 Drawing Sheet

(51) Int. Cl.
*G06K 7/10* (2006.01)
*H04L 29/08* (2006.01)
*H04L 9/06* (2006.01)

(52) U.S. Cl.
CPC ............ *H04L 67/12* (2013.01); *H04L 67/125* (2013.01); *G05B 2219/15117* (2013.01); *G05B 2219/25205* (2013.01); *G05B 2219/25428* (2013.01); *G05B 2219/31104* (2013.01); *G05B 2219/31121* (2013.01); *G05B 2219/31251* (2013.01); *G05B 2219/36159* (2013.01); *H04L 9/065* (2013.01)

(58) Field of Classification Search
CPC ........... G05B 2219/15117; G05B 2219/31121; G05B 2219/25428; G05B 2219/25205; H04L 67/125; H04L 67/12; H04L 9/065; G06K 7/10297
USPC ........................................................ 709/220
See application file for complete search history.

(56) References Cited

U.S. PATENT DOCUMENTS

| | | | |
|---|---|---|---|
| 10,057,131 B1* | 8/2018 | Brown | H04L 41/12 |
| 10,154,006 B2* | 12/2018 | Haensgen | H04L 61/2535 |
| 10,305,887 B2* | 5/2019 | Enns | H04L 63/06 |
| 2007/0168058 A1* | 7/2007 | Kephart | G05B 9/03 |
| | | | 700/82 |
| 2010/0205281 A1* | 8/2010 | Porter | H04L 41/12 |
| | | | 709/220 |

* cited by examiner

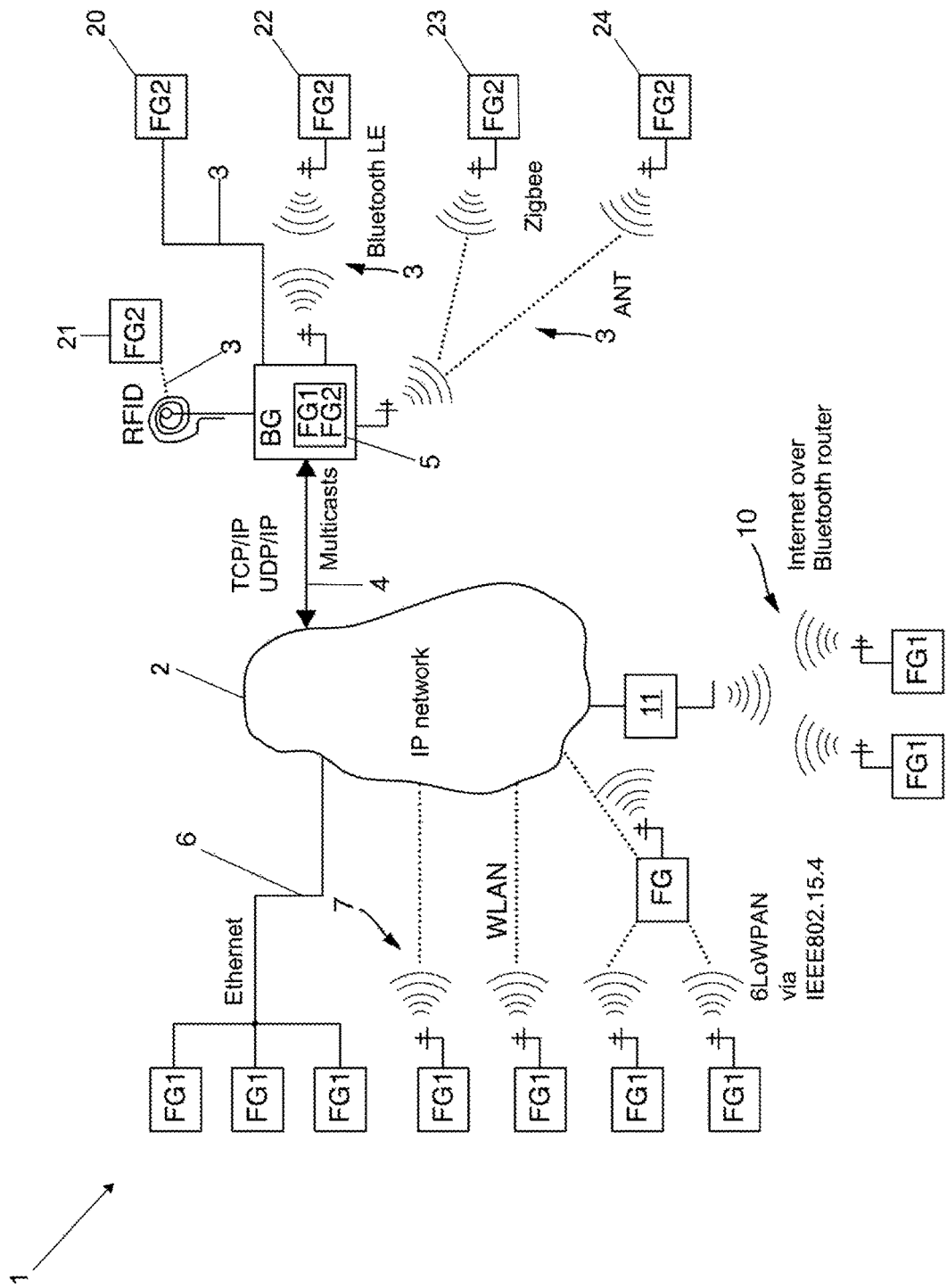

METHOD FOR OPERATING A SPECIFIC FIELD DEVICE VIA A MOBILE OPERATOR DEVICE

CROSS-REFERENCE TO RELATED APPLICATION

The present application is related to and claims the priority benefit of German Patent Application No. 10 2016 124 168.7, filed on Dec. 13, 2016, the entire contents of which are incorporated herein by reference.

TECHNICAL FIELD

The present disclosure relates to a method for operating a specific field device via a mobile operator device, and an automation technology system.

BACKGROUND

Field devices for recording and/or modifying process variables are frequently used in process automation technology, as well as in manufacture automation technology. Measuring devices or sensors, such as level measuring devices, flow meters, pressure and temperature measuring devices, pH-redox potential meters, conductivity meters, etc., are used for recording the respective process variables such as fill-level, flow, pressure, temperature, pH level, and conductivity. Actuators, such as, for example, valves or pumps, are used to influence process variables. Thus, the flow rate of a fluid in a pipeline section or a fill-level in a container can be altered by means of actuators.

Field devices, in general, refer to all devices which are process-oriented and which provide or edit process-relevant information. In addition to the aforementioned measuring devices/sensors and actuators, units that are directly connected to a field bus and used for communication with superordinate units, such as remote I/O's, gateways, linking devices, and wireless adapters, are also generally referred to as field devices.

The company group Endress+Hauser produces and distributes a large variety of such field devices.

In modern industrial plants, field devices are usually connected with superordinate units via field bus systems, such as Profibus®, Foundation Fieldbus®, HART®, etc. Normally, the superordinate units are control systems or control units, such as an SPC (Stored Program Control) or a PLC (Programmable Logic Controller). The superordinate units are used, among other things, for process control, process visualization, and process monitoring, as well as commissioning of the field devices. The values recorded by field devices sensors, in particular are transmitted via the connected bus system to one, or possibly even multiple, superordinate unit(s). In addition to that, data transfer from the superordinate unit to the field devices via the bus system is required; in particular, it serves the purpose of configuration and parameterization of field devices, as well as diagnostics. In general terms, the field device is operated via the bus system from the superordinate unit.

In the context of the present disclosure, it is significant that a networking based upon the Internet Protocol (IP) is also increasingly being integrated into field devices in industrial environments. In addition to connection-oriented communication (for example, on the basis of what is known as the TCP protocol layer) and point-to-point message transfer, e.g., on the basis of what is known as the UDP protocol, data transfer of IP data packets via what are known as broadcast addresses and multicast addresses, in which data may be simultaneously relayed from a sending unit to multiple receivers, is supported as part of the Internet protocol family.

In addition to a wired data transfer between the field devices and the superordinate unit, e.g., Ethernet/IP, there is likewise a possibility for a wireless data transmission. In the bus systems Profibus®, Foundation Fieldbus® and HART® in particular, a wireless radio-based data transfer is specified. Moreover, radio networks for sensors are specified in the standard IEEE 802.15.4 in more detail. The IEEE standard describes only the two lower layers (PHY and MAC) in the ISO-OSI model for WPAN's (Wireless Personal Area Networks). The higher protocol layers are regulated by other organizations. This enables universal use of the IEEE 802.15.4 base layer. A multitude of different technologies are using this base layer and extend the protocol stack only on the higher layers. Thus, a basis for IP-based sensor networks was created by means of the IETF standard 6LoWPAN, for example.

To enable a wireless data transfer, current field devices have various radio interfaces such as WLAN, Bluetooth, and/or near-field communication (NFC). These interfaces can be used to establish a connection to the corresponding field device in order to enable access to its process data and/or field device data or parameters.

For this kind of data transfer, typically, operating devices preferably, mobile operating devices are used, which are also fitted with multiple radio interfaces. Such operating devices can, for example, be proprietary devices, as well as newer devices such as, for example, smartphones, notebooks, or iPad's. Depending upon the radio interface, different wireless standards and technologies using different protocols are used with these devices.

Depending upon the specification of the interface and the protocol used, the operators (a service technician, for example) need to be able to use these various connection and communication technologies in order to connect them. Especially when it comes to direct, on-site operations, various field devices with various interfaces have to be operated, one after another, within a very short period of time. This results in the operators needing to bring corresponding hardware and software along with them, having to have a great amount of knowhow about the differing, technology-specific usage of access interfaces specific to the technology, and having to spend a great deal of time on the different connection establishments.

To make things more complicated, with wireless connections, it is not obviously visually apparent to the operator which wireless protocol (e.g., WLAN, Bluetooth, 6LoW-Pan) is available for certain field devices. With wired connections such as Ethernet/IP, the user must know either the name of the corresponding field device, or, alternatively, its IP address, in order to establish a connection.

Both complicate the operation or pose possible sources of error, and mean a significant loss of time for the operator when it comes to practical usage of such field devices and operator devices.

Since a communication with a plurality of remote stations may be established based upon the Internet protocol, for the user, the difficulty exists of finding out which field devices he may contact via the IP network, or which IP addresses these devices have. In particular, it is not efficiently possible to probe all conceivable IP addresses via a scanning method. An IP network therefore differs significantly from other transmission methods, such as Bluetooth or ANT, in which there is, for example, the mechanism of what is known as "advertising," in which the remote station periodically transmits broadcast messages, and it is thereby possible for the operator unit to easily establish which remote stations are currently within radio range.

SUMMARY

The present disclosure is thus based upon the aim of enabling a simpler operation of field devices with different interfaces in an automation system.

The aim is achieved via the method according to patent claim 1 and via an automation technology system according to patent claim 14.

With regard to the method, the aim is achieved via a method for operating a specific field device via a mobile operator device, wherein the field device is specifically selected from at least a first group of field devices and a second group of field devices in an automation system, wherein the first group of field devices exchange data in an IP-based network, and the second group of field devices communicates at least via a non-IP-based connection, wherein the method includes the following steps: transmission of multicast messages via at least one portion of the field devices preferably, all field devices of the first group of field devices, wherein the multicast messages comprise at least one item of connection information for connection with the respective field device from the first group which has transmitted the multicast message; integration of the operator device into the IP-based network so that the operator device may communicate with the field devices of the first group via a first IP-based connection; initiation of at least one connection establishment with at least one field device of the second group so that the operator device is connected with the at least one field device of the second group via a second, non-IP-based connection; reception, via the operator unit, of the multicast messages transmitted by the first group of field devices, wherein the connection information is made available to the operator unit via the received multicast messages; generation of a list of all field devices of the first group from which the operator unit has received the connection information via the multicast message, and of all field devices of the second group that are connected with the operator device, so that the list has field devices of the first and second groups; selection (preferably performed by an operator) of the specific field device using the list generated by the operator unit; initiation of a specific connection establishment with the specific selected field device via the operator unit, wherein the specific connection establishment is initiated using the connection information in the event that the specific selected field device belongs to the first group of field devices; and operation of the specific selected field device with the aid of the mobile operator unit.

In the sense of the present disclosure, a distinction should be made between a connection establishment and a specific connection establishment. What should hereby be understood by a connection establishment is also, in particular, a unidirectional connection, in contrast to which a specific connection establishment is necessarily to be understood as a bidirectional connection.

An advantageous embodiment of the method according to the present disclosure provides that additional meta-information about the field device which has transmitted the multicast message be communicated via said multicast messages, wherein the connection information and the meta-information are preferably transmitted together in a multicast message. In particular, the embodiment may provide that the meta-information include at least one of the following items of information: information about the name of the field device; information about a power budget of the field device; information about a device status of the field device; information about a field device type of the field device; information about a primary measurement value of the field device; and information about additional, secondary measurement values of the field device.

An additional advantageous embodiment of the method according to the present disclosure provides that additional position information about the field device of the first group which has transmitted the multicast message be communicated via the multicast messages, wherein the connection information and the position information are preferably transmitted together in a multicast message, wherein the connection information, the meta-information, and the position information are particularly preferably transmitted together in a multicast message. In particular, the embodiment may provide that the list be sorted using the position information, such that at least the field devices of the first group preferably, the field devices of the first and second groups are listed according to a spatial proximity to a site preferably the current site of the mobile operator unit.

An additional embodiment of the method according to the present disclosure provides that the multicast message be at least partially encrypted and/or cryptographically authenticated preferably, at least the meta-information, and, particularly preferably, at least the primary measurement value of the field device.

The advantage for the system operator consists in this cryptographic protection, in that an attacker with access to the IP network of the system is not immediately in a position to obtain sensitive information that is, for example, contained in the transmitted metadata. Via an authentication of the meta-information, e.g., via what are known as digital signatures (asymmetrical method) or message authentication codes (symmetrical method), an attacker cannot propagate falsified multicast messages in the IP network of the system without being detected. Therefore, the information in the multicast messages is, advantageously, at least partially encrypted and authenticated. Conceivable as a method is thereby, in particular, a combination of an encryption algorithm, e.g., a block encryption such as AES or DES, a stream cipher (RC4, Salsa20, Sosemanuk, Rabbit, HC-128, Trivium, etc.) with an authentication code, e.g., AES128CBC, Hahs-based codes (HMAC), uniform hashing methods (Poly1305, and authentication in AES-GCM), or digital signature methods (for example, based upon large prime number fields, elliptical curves, Merkle trees, etc.).

Also usable as an alternative to the combination of a separate encryption and authentication method are merged solutions for example, as are currently under scientific review within the scope of what is known as the CESAR competition.

An advantageous embodiment of the method according to the present disclosure in turn provides that the operator device be registered in the IP-based network preferably on a multicast channel of the IP-based network to receive the multicast message. In particular, the embodiment may provide that the multicast messages be relayed to the operator device via a switching center of the IP-based network to which the multicast messages are sent from the field devices of the first group, if the operator device is registered or subscribed to receive the multicast message in the IP-based network preferably, in a multicast channel of the IP-based network.

An additional advantageous embodiment of the method according to the present disclosure provides that the multicast message be sent cyclically by the at least one portion of the field devices preferably, all field devices of the first group, wherein the multicast message is preferably sent from the respective field device essentially synchronously with a measurement clock in which a or the primary measurement value of the respective field device is detected.

An additional embodiment of the method according to the present disclosure provides that, in the event that the IP-based network allows no (preferably, cyclical) sending of multicast messages, the operator device in the IP-based network actively poll for multicast messages in the field devices of the first group.

An additional advantageous embodiment provides that, in addition to the multicast messages transmitted "unasked," field devices of the first group also allow the messages to be actively transmitted upon request to an IP address transmitted in the request. For example, by means of this method, it is possible to allow a more frequent transfer of the metadata than, for example, in the cyclical rotation of the multicast messages. In the example, to preserve the transmission bandwidth, multicast messages are only sent once every 10 seconds; however, the corresponding content might also be transmitted more frequently to the IP address of the operator unit.

An additional advantageous embodiment of the method according to the present disclosure provides that the operator device simultaneously or sequentially initiate additional connection establishments with additional field devices of the second group, so that the operator device is connected via additional, non-IP-based connection with the additional field devices of the second group, and wherein the list is generated by the operator device with the additional field devices as well.

An additional advantageous embodiment of the method according to the present disclosure provides that, in the event that the specific selected field device belongs to the second group of field devices, the specific connection establishment be realized or initiated via the second, non-IP-based connection upon initiation of the specific connection establishment.

An additional, advantageous embodiment of the method according to the present disclosure provides that no data be exchanged by the field devices of the second group in the IP-based network.

As far as the system is concerned, the aim is achieved via an automation technology system that comprises the following: a first group of field devices which communicates via an IP-based network, wherein at least one portion of the field devices of the first group preferably, all field devices transmits multicast messages, wherein the multicast messages include at least one item of connection information for connection with the respective field device from the first group which sent out the multicast message; a second group of field devices which may exchange data via a non-IP-based connection; and a mobile operator unit that is set up so that a first connection to the IP-based network can be established and, in the event that a connection to the IP-based network is established, the operator unit receives the transmitted multicast messages so that the connection information is available to the operator via the received multicast messages; wherein the operator unit is also set up to establish a second, non-IP-based connection to the field devices of the second group, so that the field devices of the second group are connected to the operator unit; wherein the operator unit is also set up to generate a list in which are entered all field devices of the first group from which the connection information is made available to the operator unit via the multicast message, and all field devices of the second group that are connected to the operator device via the second connection, such that the list has field devices of the first group and second group; wherein the operator unit is also set up to initiate a specific connection establishment with a field device entered in the list if the field device in the list is selected; wherein the operator device implements the specific connection establishment using the connection information in the event that the specific selected field device belongs to the first group of field devices.

An advantageous embodiment of the system according to the present disclosure provides that the first group of field devices communicate in at least one of the following IP-based networks, or a combination thereof: an Ethernet or Ethernet/IP network; a WLAN network; 6LoWPAN network; Profinet network; and a Bluetooth-based field device network integrated into an IP network, having one or more Bluetooth-based field devices, wherein the additional Bluetooth-based field devices are connected with the IP-based network via a link unit, wherein, for this, the link unit may be addressed in the IP-based network, and the additional Bluetooth-based field devices are connected via a Bluetooth connection with the link unit so that the additional Bluetooth-based field devices are integrated into the IP-based network.

An additional advantageous embodiment of the system according to the present disclosure provides that the second group of field devices communicate via at least one of the following non-IP-based networks, or a combination thereof: an RFID connection; a wired connection in particular, a Profibus-based or HART-based connection; a radio-based, point-to-point connection in particular, based upon the Bluetooth or Bluetooth LE standard or IEEE802.15.4 protocol; a mesh network preferably, based upon the IEEE802.15.4 radio protocol, and, particularly preferably, a Zigbee-based connection or a WirelessHART-based connection; and an ANT protocol-based connection.

An additional advantageous embodiment of the system according to the present disclosure in turn provides that the operator device also be set up to initiate additional simultaneous or sequential connection establishments with additional field devices of the second group, such that the operator device can be connected with the additional field devices of the second group via additional non-IP-based connections, and the operator unit generates the list also with the additional field devices of the second group in the event that additional non-IP-based connections to additional field devices of the second group are established.

An additional advantageous embodiment of the system according to the present disclosure provides that the field devices of the second group not be part of the IP-based network in particular, exchange no data in the IP-based network.

A last embodiment of the system according to the present disclosure provides that the connection information have an IP address and/or a port number of the field device of the first group from which the multicast message was sent.

BRIEF DESCRIPTION OF DRAWINGS

The present disclosure is explained in more detail based upon the following drawing. Illustrated are:

FIG. 1 shows an example of an automation technology system according to the present disclosure.

DETAILED DESCRIPTION

FIG. 1 shows an example of an automation technology system. In modern automation systems 1, a plurality of field devices is conventionally found that exchange data both with one another and with a mobile operator device BG in very different ways. Presented as an example in FIG. 1 are a series of field devices that exchange data in different ways in corresponding networks.

In the sense of the present disclosure, a distinction is to be made between field devices that exchange data in an IP-based network 2, i.e., according to an Internet protocol for example, TCP/IP or UDP/IP and field devices that exchange data via a non-IP-based connection 3 for example, a point-to-point connection.

As an example, depicted in FIG. 1 are field devices of a first group FG1 that exchange data in an IP-based network 2. Moreover, in the sense of the present application, such field devices FG1 that exchange data in an IP-based network 2 and that are made IP-capable via a link unit, e.g., a Bluetooth router, should also be understood as field devices. For this, a link unit 11 on the one hand establishes a Bluetooth connection 10 preferably, a standing (i.e., permanent) Bluetooth connection 10 with the field devices, and, on the other hand, is integrated into an IP network, so that the field devices can be addressed through the IP network via the link unit. In this instance, the data of the IP-based network are tunneled through the Bluetooth connection 10. This instance is shown by way of example in FIG. 1.

In contrast to this, in the sense of the present application, are field devices of the second group FG2 that exchange data via a non-IP-based connection 3, i.e., the data transfer is not based upon an Internet protocol—in particular, not upon TCP/IP and UDP/IP—in contrast to the aforementioned field devices. These instances are indicated by a respective field device as an example in FIG. 1. However, in principle, these field devices may exchange data with one another in a network in particular, in a non-IP-based network.

For example, such field devices FG2 may exchange data over wires, via a non-IP-based network for example, HART or Profibus. In FIG. 1, a field device 20 connected via wire to the operator unit BG is shown as an example. Field devices may also exchange data wirelessly via a non-IP-based connection. Examples of such field devices FG2 that are set up to establish a non-IP-based wireless connection for data exchange are presented by way of example in FIG. 1. FIG. 1 shows a field device 21 which enables a simple, wireless, point-to-point connection, via an RFID interface, with the mobile operator device for data exchange. FIG. 1 shows a field device 22 which enables a non-IP-based wireless connection for example, in the form of a Bluetooth connection. Contrary to the permanent Bluetooth connection 10 depicted in FIG. 1, the Bluetooth connection is here established only sporadically for data exchange. The underlying technology may thereby be based upon Bluetooth technology, or upon a technology derived from this, e.g., Bluetooth Low Energy. Moreover, in FIG. 1, a field device 23 is depicted which is set up to exchange data wirelessly according to a Zigbee specification. For example, this may take place with the mobile operator unit and as depicted in FIG. 1. However, the data transfer according to the Zigbee specification may also take place with other field devices, such that these field devices span a Zigbee network. A last variant is depicted in FIG. 1, in which the field device 24 is set up to exchange data wirelessly with the mobile operator unit according to an ANT standard.

In order for an operator for example, a service technician to be able to access all field devices FG1 and FG2 of the automation system, said operator possesses a mobile operator unit BG that is designed with various interfaces for data transfer. The mobile operator unit, e.g., a PC, smartphone, or tablet, has at least two different interfaces: an interface for IP-based data transfer, e.g., Ethernet, Ethernet/IP, WLAN, 6LoWPAN and/or Bluetooth; and another interface for non-IP-based data transfer, e.g., RFID, Profibus, HART, Bluetooth, Zigbee, or ANT.

A software or app runs on the mobile operator unit BG, via which a selection list 5 is displayed to the operator in which are listed all field devices FG1 and FG2 that have a communication connection or are within communication range of the mobile operator unit.

In order to be able to generate and display such a selection list 5, the field devices of the first group FG1 are designed such that these transmit a multicast message preferably, at cyclical intervals. In the event that the multicast messages are transmitted cyclically, these are preferably transmitted essentially synchronously with the measurement clock in which the primary measurement value of the respective field device is detected. As an alternative to this, in the event that the IP-based network does not permit the transmission of multicast messages, it may be provided that the operator device BG actively poll the field devices of the first group FG1 in the IP-based network 2 for multicast messages.

The multicast messages respectively have connection information. A specific connection establishment with the field device transmitting the multicast message can be produced via the connection information. For example, the connection information may have an IP address of the field device. The field devices of the first group FG1 may also be set up such that, in addition to the connection information, with the multicast message, these also transmit meta-information about the field device that transmits the multicast message. The field devices thus transmit multicast messages which have at least the connection information and additional meta-information.

Such meta-information or metadata may include at least one of the following items of information:

The field devices of the first group FG1 may also be set up such that the multicast messages additionally have geographic position information, e.g., in the form of degrees of latitude and longitude, about the field device which has sent the multicast message. In this instance, the field devices of the first group transmit meta-information and/or position information together with the connection information in one and the same multicast message. The transmitted multicast messages may be at least partially encrypted and/or cryptographically authenticated, to protect the transmitted information. In particular, the primary measurement value, which is possibly transmitted as meta-information with the multicast message, may be encrypted.

The multicast messages may be received within the IP-based network by a switching unit or switching center which is part of said IP-based network, insofar as the IP-based network has such a switching unit. A switching unit is not absolutely necessary, but offers the advantage that a system operator may monitor which operator device receives possible multicast messages of the field devices of the first group, and thus is in a position to receive the connection information and the meta-information and/or the position information of the field devices.

For this, the mobile operator unit BG is integrated into the IP-based network FG1 so that this may exchange data as needed with one or more of the network participants via a first connection. The integration may take place between the mobile operator unit BG and the switching unit as a network participant of the IP-based network. However, it is also conceivable that the mobile operator unit BG is integrated into the IP-based network via another network participant.

Via the IP-based connection, after the integration, data may be exchanged between the mobile operator unit BG and the network participants of the IP-based network FG1. For example, a WLAN-based connection to a network participant of the IP-based network FG1 may be established via the mobile operator unit BG, and the operator unit BG may subsequently scan the IP-based network for transmitted multicast messages.

Via the IP-based connection to the IP-based network, the mobile operator unit BG is thus in a position to receive the multicast messages. It may possibly be provided that the mobile operator unit BG must first register with the switching unit, i.e., must subscribe to the multicast messages, to receive said multicast messages. Via a prior registration of the mobile operator unit BG, a system operator may control whether and possibly which mobile operator unit receives access to the multicast messages, and thus the corresponding field devices.

Via the reception of the multicast messages at the mobile operator unit BG, the corresponding connection information is also made available to said operator unit BG. The connection information is used by the operator unit BG to generate the selection list 5. All field devices of the first group from which the operator unit has received the connection information via the received multicast messages are hereby listed. In the event that position information is also transmitted via the multicast message, the selection list may thereby be sorted such that the listed field devices are sorted according to spatial distance from the site of the mobile operator unit.

In addition to the field devices of the IP-based network, however, automation systems 1 also comprise other field devices that do not exchange data in an IP-based network and also do not communicate via an IP-based interface. The operator of the mobile operator unit BG would likewise like these field devices to be listed in the selection list 5. For this, the operator unit BG initiates a non-IP-based connection with the field device or field devices of the second group FG2. For example, the operator unit BG may be connected via a wire to a field bus, e.g., HART or Profibus, so that a connection to the field devices can be initiated via the field bus. However, wireless non-IP-based connections for example, via a near-field communication interface for RFID that is integrated into the operator unit may be used by the operator unit BG to initiate non-IP-based wireless connections to field devices of the second group FG2. With which of the field devices of the second group the operator device initiates a non-IP-based connection depends upon the concrete embodiment of the operator unit, which is different for each operator unit. For example, instead of the near-field communication interface for RFID, an operator unit BG may have a Bluetooth or even Bluetooth LE interface, and may accordingly initiate a non-IP-based Bluetooth connection to a field device of the second group. Naturally, the operator unit may also have a near-field communication interface for RFID and a Bluetooth interface, and thus may establish a non-IP-based RFID connection to a field device with RFID and a non-IP-based Bluetooth connection to a field device with Bluetooth. In addition to the aforementioned non-IP-based wireless connections, additional non-IP-based wireless connections may also be initiated with field devices of the second group for example, connections according to Zigbee and/or ANT or ANT+.

The software or app that is running on the mobile operator unit thus generates a selection list that includes both the field devices of the first group FG1 and those of the second group FG2 to which a non-IP-based connection was initiated by the operator unit BG.

The invention claimed is:

1. A method for operating a specific field device via a mobile operator device, wherein the specific field device is specifically selected from at least a first group of field devices and a second group of field devices in an automation system, wherein the first group of field devices exchange data in an IP-based network, and the second group of field devices communicate at least via a non-IP-based connection or transmission route, the method comprising:
   transmitting multicast messages from at least one portion of the field devices of the first group of field devices, wherein the multicast messages include at least one item of connection information for connection with the respective field device that transmitted the multicast message;
   integrating the mobile operator device into the IP-based network so that the mobile operator device is enabled to communicate with the field devices of the first group via a first IP-based connection;
   initiating at least one connection establishment with at least one field device of the second group so that the mobile operator device is enabled to receive data from the at least one field device of the second group via a second, non-IP-based transmission route;
   receiving via the mobile operator device the multicast messages transmitted by the first group of field devices, wherein the at least one item of connection information is made available to the mobile operator device via the received multicast messages;
   generating a list of all field devices of the first group from which the mobile operator device received the at least one item of connection information via the multicast messages, and of all field devices of the second group that are connected with the mobile operator device, such that the list includes field devices of the first group and the second group;
   selecting the specific field device using the list generated by the mobile operator device;
   initiating a specific connection establishment with the specific field device via the mobile operator device, wherein the specific connection establishment is initiated using the connection information id the specific field device belongs to the first group of field devices; and
   operating the specific field device with the aid of the mobile operator device.

2. The method according to claim 1, wherein the multicast messages further include meta-information about the field device that transmitted the multicast messages, and wherein the connection information and the meta-information are transmitted together in the multicast messages.

3. The method according to claim 2, wherein the meta-information includes at least one of the following items: a name of the field device; a power budget of the field device; a device status of the field device; a field device type of the field device; a primary measurement value of the field device; and additional, secondary measurement values of the field device.

4. The method according to claim 2, wherein the multicast messages further include position information about the field device of the first group that transmitted the multicast messages, wherein the connection information and the position information are transmitted together in the multicast messages, and wherein the connection information, the meta-information, and the position information are transmitted together in the multicast messages.

5. The method according to claim 4, wherein the list is sorted using the position information such that the field devices of the first group and the field devices of the second group are listed according to a spatial proximity to the current site of the mobile operator device.

6. The method according to claim 3, wherein the multicast messages are at least partially encrypted and/or cryptographically authenticated.

7. The method according to claim 1, wherein the mobile operator device is registered in the IP-based network on a multicast channel of the IP-based network to receive the multicast messages.

8. The method according to claim 7, wherein the multicast messages are relayed to the mobile operator device via a switching center of the IP-based network to which the multicast messages are sent from the field devices of the first group, if the mobile operator device is registered or subscribed to receive the multicast messages in the IP-based network in a multicast channel of the IP-based network.

9. The method according to claim 1, wherein the multicast messages are sent cyclically by the at least one portion of the field devices of the first group, wherein the multicast messages are sent from the respective field device synchronously with a measurement clock in which a primary measurement value of the respective field device is detected.

10. The method according to claim 9, wherein, if the IP-based network allows no cyclical sending of multicast messages, or if a cyclical period is too long, the mobile operator device in the IP-based network is configured to poll for messages in the field devices of the first group.

11. The method according to claim 1, wherein the mobile operator device simultaneously or sequentially initiates additional connection establishments with additional field devices of the second group, so that the mobile operator device is connected via additional, non-IP-based connections with the additional field devices, and wherein the list generated by the mobile operator device includes the additional field devices.

12. The method according to claim 1, wherein if the specific field device belongs to the second group of field devices, the specific connection establishment is realized or initiated via the second, non-IP-based connection upon initiation of the specific connection establishment.

13. The method according claim 1, wherein no data are exchanged in the IP-based network by the field devices of the second group.

14. An automation technology system, comprising:
a first group of field devices configured to communicate via an IP-based network, wherein at least one portion of the field devices of the first group is configured to transmit multicast messages, wherein the multicast messages include at least one item of connection information for connection with the respective field device from the first group configured to transmit the multicast messages;
a second group of field devices configured to communicate via a non-IP-based connection;
a mobile operator unit configured to establish a first connection to the IP-based network and, if a connection to the IP-based network is established, the mobile operator unit is enabled to receive the transmitted multicast messages such that the connection information is available to an operator via the received multicast messages; wherein the mobile operator unit is also configured to establish a second, non-IP-based connection to the field devices of the second group, such that the field devices of the second group are connected to the mobile operator unit; wherein the mobile operator unit is also configured to generate a list of all field devices of the first group from which the connection information is made available to the mobile operator unit via the multicast messages, and all field devices of the second group that are connected to the mobile operator unit via the second connection, such that the list has field devices of the first group and of the second group; wherein the mobile operator unit is also configured to initiate a specific connection establishment with a field device in the list if the field device in the list is selected; wherein the mobile operator unit is configured to perform the specific connection establishment using the connection information if that the specific field device belongs to the first group of field devices.

15. The automation technology system according to the claim 14 wherein the first group of field devices communicates in at least one of the following IP-based networks: an Ethernet or Ethernet/IP network; a WLAN network; 6LoWPAN network; Profinet network; and a Bluetooth-based field device network integrated into an IP network, having at least one Bluetooth-based field device, wherein the at least one Bluetooth-based field device is connected with the IP-based network via a link unit, wherein, the link unit is configured to be addressed in the IP-based network, and the at least one Bluetooth-based field devices is connected via a Bluetooth connection with the link unit so that the at least one Bluetooth-based field device is integrated into the IP-based network.

16. The automation technology system according to claim 14, wherein the second group of field devices communicates via at least one of the following non-IP-based networks: an RFID connection; a wired Profibus-based or HART-based connection; a radio-based, point-to-point connection based upon the Bluetooth or Bluetooth LE standard or IEEE802.15.4 protocol; a mesh network based upon the IEEE802.15.4 radio protocol, a Zigbee-based connection, or a WirelessHART-based connection; and an ANT protocol-based connection.

17. The automation technology system according to claim 14, wherein the mobile operator unit is additionally configured to initiate additional simultaneous or sequential connection establishments with additional field devices of the second group, such that the mobile operator unit can be connected with the additional field devices of the second group via additional non-IP-based connection, and the mobile operator unit is configured to generate the list also with the additional field devices of the second group if the additional non-IP-based connections to additional field device of the second group are established.

18. The automation technology system according to claim 14, wherein the field devices of the second group are not part of the IP-based network and exchange no data in the IP-based network.

19. The automation technology system according to claim 14, wherein the connection information includes an IP address and/or a port number of the field device of the first group from which the multicast messages were sent.

* * * * *